United States Patent
Ikegawa

(10) Patent No.: US 6,809,902 B2
(45) Date of Patent: Oct. 26, 2004

(54) THIN FILM MAGNETIC HEAD AND METHOD OF MANUFACTURING THE SAME

(75) Inventor: Yukinori Ikegawa, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 47 days.

(21) Appl. No.: 10/348,567

(22) Filed: Jan. 21, 2003

(65) Prior Publication Data

US 2004/0042117 A1 Mar. 4, 2004

(30) Foreign Application Priority Data

Aug. 30, 2002 (JP) ........................................ 2002-252897

(51) Int. Cl.[7] ............................ G11B 5/147; G11B 5/31
(52) U.S. Cl. ................................................... 360/126
(58) Field of Search .................................. 360/125, 126

(56) References Cited

U.S. PATENT DOCUMENTS

| | | | | |
|---|---|---|---|---|
| 5,241,440 A | * | 8/1993 | Ashida et al. | 360/126 |
| 5,621,596 A | * | 4/1997 | Santini | 360/126 |
| 5,793,578 A | * | 8/1998 | Heim et al. | 360/126 |
| 6,400,527 B1 | * | 6/2002 | Gochou et al. | 360/126 |
| 2002/0071209 A1 | | 6/2002 | Watanabe et al. | |

FOREIGN PATENT DOCUMENTS

JP      2000300217      1/2000

* cited by examiner

Primary Examiner—George J. Letscher
(74) Attorney, Agent, or Firm—Greer, Burns & Crain, Ltd.

(57) ABSTRACT

The thin film magnetic head has stable recording characteristics. The thin film magnetic head of the present invention comprises: lower and upper magnetic poles; an insulating layer formed between the magnetic poles, the insulating layer having a apex part; a coil formed in the insulating layer; and a gap layer formed between the magnetic poles faced each other. The coil is provided in a concave part of the lower magnetic pole. The concave part is filled with a first insulating layer. A high magnetic permeability layer is formed on the lower magnetic pole which faces the upper magnetic pole. The gap layer is formed on the high magnetic permeability layer. A second insulating layer is formed on the first insulating layer. A third insulating layer is formed on the second insulating layer and has the apex part.

6 Claims, 3 Drawing Sheets

THIN FILM MAGNETIC HEAD AND METHOD OF MANUFACTURING THE SAME

BACKGROUND OF THE INVENTION

The present invention relates to a thin film magnetic head and a method of manufacturing the thin film magnetic head.

An ordinary thin film magnetic head having a recording head section 10 and a reproducing head section 12 is shown in FIG. 6.

An insulating layer 14, which is made of, for example, alumina, is formed on a substrate 13, which is made of, for example, a ceramic. A lower shielding layer 15, which is made of, for example, FeNi, is formed on the insulating layer 14. An insulating layer 16, which is made of, for example, alumina, is formed on the lower shielding layer 15. An SAL (soft adjacent layer) 17, which is made of, for example, FeNi, is formed on the insulating layer 16. A spacer layer 18, which is made of, for example, tantalum, titanium, is formed on the SAL 17.

A pair of terminals 19 and 20 are formed on the spacer layer 18. An MR layer 21, which is made of FeNi, is formed on the spacer layer 18 and located between the terminals 19 and 20. An insulating layer 22, which is made of, for example, alumina, is formed on the terminals 19 and 20 and the MR layer 21. An upper shielding layer 23, which is made of, for example, FeNi, is formed on the insulating layer 22.

The insulating layer 14, the lower shielding layer 15, the insulating layer 16 the SAL 17, the spacer layer 18, the MR layer 21, the terminals 19 and 20, the insulating layer 22 and the upper shielding layer 23, etc. constitute the reproducing head section 12 for reproducing data.

An insulating layer 24, which is made of, foe example, alumina, is formed on the upper shielding layer 23. A coil 25 is formed in the insulating layer 24. An upper magnetic pole 26 is provided on the insulating layer 24. A protection layer 27, which is made of, for example, alumina, is formed on the upper magnetic pole 26. The upper shielding layer 23, the insulating layer 24, the coil 25, the upper magnetic pole 26 and the protection layer 27, etc. constitute the recording head section 10.

Note that, the upper shielding layer 23 also acts as a lower magnetic pole of the recording head section 10.

FIG. 7 shows a sectional view of the recording head section 10. The structure of the recording head section 10 will be explained with reference to FIG. 7.

The lower magnetic pole 23a, which is made of FeNi, is formed on the substrate 23 (the upper shielding layer 23) by plating. Thickness of the lower magnetic pole 23a is considerably thick, e.g., 6–7 $\mu$m, so the lower magnetic pole 23a cannot be formed by spattering; therefore, it is made by electrolytic plating.

An insulating layer 28, which is made of, for example, alumina, is formed in a concave part 23b of the lower magnetic pole 23a and on the substrate 23 by spattering. The coil 25 is formed on the insulating layer 28 by plating.

The concave part 23b is filled with an insulating layer 29, which is made of resist and which covers over the coil 25.

A surface of the insulating layer 29 is flatly lapped until its level is made equal to that of the lower magnetic pole 23a.

A high magnetic permeability layer 30, which is made of a high magnetic permeability material, e.g., CoFeNi, whose magnetic permeability is higher than that of the lower magnetic pole 23a, is formed on a surface of the lower magnetic pole 23a located on the write-end side, which faces the upper magnetic pole 26 with a gap layer 31. It is difficult to form the high magnetic permeability layer 30 by electrolytic plating; therefore, it is formed by spattering, and its thickness is about 0.5 $\mu$m.

By forming the high magnetic permeability layer 30, a level difference is made between a surface of the high magnetic permeability layer 30 and a surface of the insulating layer 29.

The gap layer 31, which is made of, for example, $SiO_2$, is formed on the surfaces of the high magnetic permeability layer 30 and the insulating layer 29.

Next, an insulating layer 32, which is made of resist, is formed on the gap layer 31, to correspond to the insulating layer 29 and a part of the high magnetic permeability layer 30 adjacent to the insulating layer 29.

By adjusting viscosity of the resist of the insulating layer 32, an apex part 33, whose thickness is made thinner toward the write-end (the left end in the drawing of FIG. 7), is formed in the insulating layer 32.

Next, the gap layer 31 and the insulating layer 32 are covered with resist so as to form a mask (not shown). Then, the upper magnetic pole 26 is formed by electrolytic plating. Further, the mask is removed, then the protection layer 27 is formed. By forming the protection layer 27, the thin film magnetic head is completed.

In the above described conventional thin film magnetic head, the high magnetic permeability layer 30 is formed in the vicinity of the gap layer 31 so as to improve recording ability, and the apex part 33 of the insulating layer 32 is located on the high magnetic permeability layer 30.

A distance "GD" between a front end of the apex part 33 and an end face of the gap layer 31 (or a disk-side face) is called a gap depth; and an inclination angle "$\theta$" of the apex part 33 is called an apex angle.

The gap depth GD and the apex angle $\theta$ highly influence characteristics of recording data.

If the gap distance GD is short, leakage a magnetic field is reduced and loss of a recording magnetic field, which is generated on the disk-side face side, is reduced, so that an over-write characteristic of the recording characteristics can be improved. However, if the gap depth GD is too short, e.g., 0.2 $\mu$m or less, it is very difficult to correctly position a front end of the apex part 33, and the deviation of the front end badly influences the recording characteristics. The optimum gap depth GD is determined by considering the recording characteristics and manufacturing efficiency of the thin film magnetic head.

The apex angle $\theta$ should be wide so as to reduce the leakage magnetic field between the lower magnetic pole 23 and the upper magnetic pole 26. However, if the apex angle $\theta$ is too wide, it is difficult to form the upper magnetic pole 26. Therefore, the optimum apex angle $\theta$ is determined by considering the recording characteristics and manufacturing efficiency of the thin film magnetic head as well as the gap depth GD.

Preferably, the gap depth GD and the apex angle $\theta$ are independently controlled so as to make the recording characteristics optimum.

However, it is very difficult to independently control the gap depth GD and the apex angle $\theta$ by adjusting the viscosity of the resist forming the insulating layer 32.

Namely, if the gap depth GD is changed, the apex angle $\theta$ is simultaneously changed.

FIG. 8 is a graph showing a relationship between the gap depth GD and the apex angle θ. As clearly shown in FIG. 8, the apex angle θ is made wider when the gap depth GD is reduced. The variation is influenced by sorts and viscosity of the resist.

As described above, it is very difficult to manufacture the thin film magnetic heads without limiting the variation of the gap depth GD and the apex angle θ, so that the variation of the recording characteristics of the thin film magnetic heads cannot be limited within a desired range.

SUMMARY OF THE INVENTION

An object of the present invention is to provide a thin film magnetic head having stable recording characteristics.

Another object of the present invention is to provide a method of manufacturing the thin film magnetic head, in which the gap depth GD and the apex angle θ can be independently controlled.

To achieve the object, the present invention has following structures.

Namely, the thin film magnetic head of the present invention comprises: a lower magnetic pole; an upper magnetic pole; an insulating layer being formed between the lower magnetic pole and the upper magnetic pole, the insulating layer having a apex part which is formed in the vicinity of a write-end of the thin film magnetic head and whose thickness is made thinner toward the write-end; a coil being formed in the insulating layer; and a gap layer being formed between the write-end of the lower magnetic pole and the write-end of the upper magnetic pole which are faced each other, wherein the insulating layer includes a first insulating layer, a second insulating layer and a third insulating layer, the coil is provided in a concave part formed in the lower magnetic pole; the concave part is filled with the first insulating layer, which insulates the coil from the lower magnetic pole, a high magnetic permeability layer, whose magnetic permeability is higher than that of the lower magnetic pole, is formed on a surface of the lower magnetic pole which faces the upper magnetic pole at the write-end, the gap layer is formed on the high magnetic permeability layer, the second insulating layer is formed on the first insulating layer so as to make up a level difference between the high magnetic permeability layer and the first insulating layer, and the third insulating layer is formed on the second insulating layer and has the apex part.

In the thin film magnetic head, the third insulating layer may be a film of $SiO_2$.

In the thin film magnetic head, the third insulating layer may be a film of $Al_2O_3$.

The method of the present invention is the method of manufacturing a thin film magnetic head, which comprises: a lower magnetic pole; an upper magnetic pole; an insulating layer being formed between the lower magnetic pole and the upper magnetic pole, the insulating layer having a apex part which is formed in the vicinity of a write-end of the thin film magnetic head and whose thickness is made thinner toward the write-end, the insulating layer including a first insulating layer, a second insulating layer, a third insulating layer and a fourth insulating layer; a coil being formed in the insulating layer; and a gap layer being formed between the write-end of the lower magnetic pole and the write-end of the upper magnetic pole which are faced each other, comprising the steps of: forming the lower magnetic pole, which has a concave part for accommodating the coil, in a substrate; forming the fourth insulating layer in the concave part; forming the coil on the fourth insulating layer; forming the first insulating layer which covers over the coil and fills the concave part; forming a high magnetic permeability layer, whose magnetic permeability is higher than that of the lower magnetic pole, on a surface of the lower magnetic part which faces the upper magnetic pole at the write-end; forming the gap layer on the high magnetic permeability layer; forming the second insulating layer on the first insulating layer so as to make up a level difference between the high magnetic permeability layer and the first insulating layer; forming the third insulating layer which covers the second insulating layer and which has the apex part; and forming an upper magnetic pole which covers over the gap layer and the third insulating layer.

In the method, the third insulating layer may be made of resist.

In the method, the third insulating layer may be a film of $SiO_2$ or $Al_2O_3$ formed by spattering, and the apex part may be formed by ion milling.

In the thin film magnetic head of the present invention, the gap depth GD and the apex angle θ can be fixed, so that stable recording characteristics can be gained.

In the method of the present invention, the gap depth GD and the apex angle θ can be independently controlled during a process, so that they can be precisely formed.

BRIEF DESCRIPTION OF THE DRAWINGS

Embodiments of the present invention will now be described by way of examples and with reference to the accompanying drawings, in which.

DETAILED DESCRIPTION OF THE EMBODIMENTS

Figure 1:
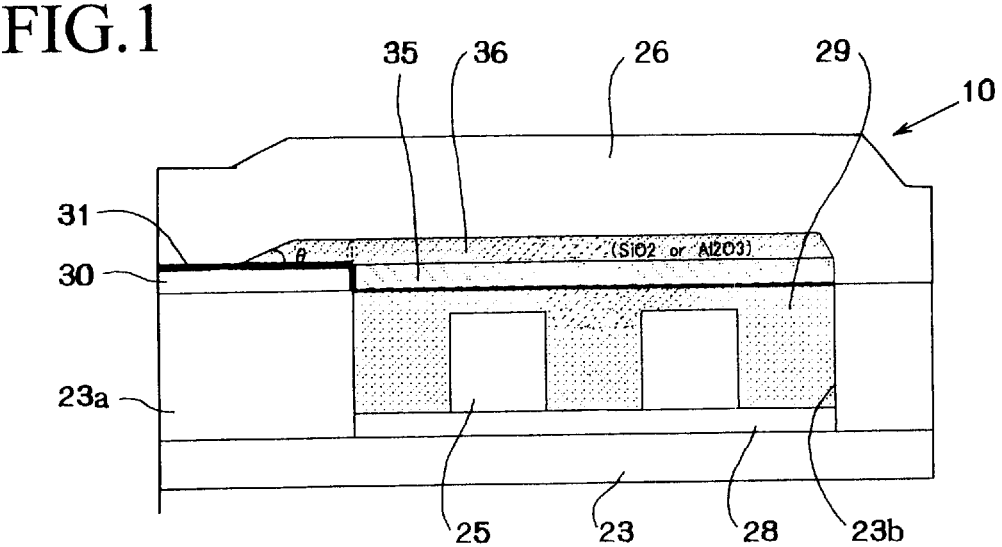
FIG. 1 is a sectional view of a recording head section of a thin film magnetic head related to the present invention.

Preferred embodiments of the present invention will now be described in detail with reference to the accompanying drawings. FIG. 1 is a sectional view of a recording head section of a thin film magnetic head of the present embodiment. Note that, structural elements described in BACKGROUND OF THE INVENTION are assigned the same symbols and explanation will be omitted.

The structure of the recording head section 10 and the method of manufacturing the same will be explained with reference to FIGS. 2–5, in which manufacturing steps are shown.

Figure 2:
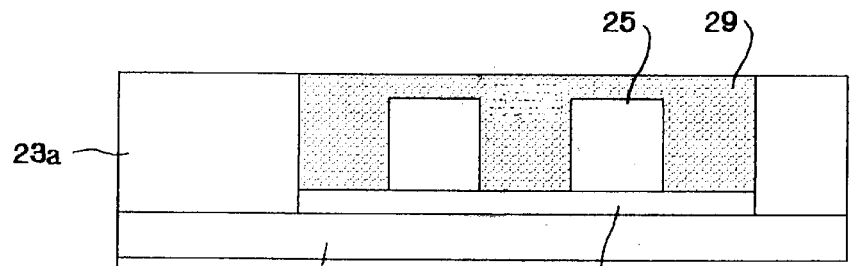
FIG. 2 is an explanation view showing a step in which a coil is formed.

As shown in FIG. 2, the lower magnetic pole 23a, which is made of FeNi, is formed on the substrate 23 (the upper shielding layer 23) by plating. Thickness of the lower magnetic pole 23a is considerably thick, e.g., 6–7 $\mu$m, so the lower magnetic pole 23a cannot be formed by spattering; therefore, it is made by electrolytic plating.

A fourth insulating layer 28, which is made of, for example, alumina, is formed in the concave part 23b of the lower magnetic pole 23a and on the substrate 23 by spattering. The coil 25 is formed on the fourth insulating layer 28 by plating.

The concave part 23b is filled with a first insulating layer 29, which is made of resist (thermosetting resin) and which covers over the coil 25.

A surface of the first insulating layer 29 is flatly lapped until its level is made equal to that of the lower magnetic pole 23a.

Figure 3:
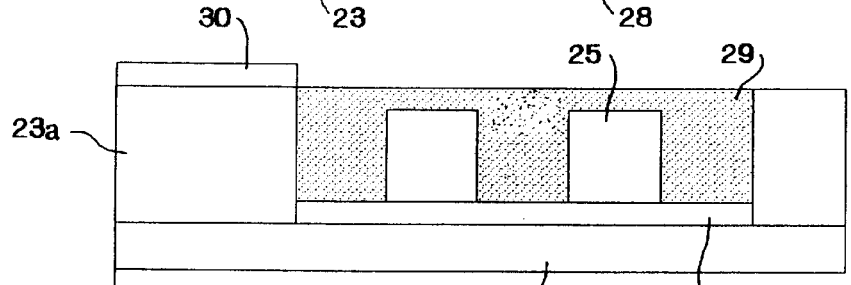
FIG. 3 is an explanation view showing a step in which a high magnetic permeability layer is formed.

Next, as shown in FIG. 3, the high magnetic permeability layer 30, which is made of a high magnetic permeability material, e.g., CoFeNi, whose magnetic permeability is higher than that of the lower magnetic pole 23a, is formed on a surface of the lower magnetic pole 23a located on the write-end side, which faces the upper magnetic pole 26 with the gap layer 31. It is difficult to form the high magnetic permeability layer 30 by electrolytic plating; therefore, it is formed by spattering, and its thickness is about 0.5 μm.

By forming the high magnetic permeability layer 30, a level difference is made between a surface of the high magnetic permeability layer 30 and a surface of the first insulating layer 29.

Figure 4:
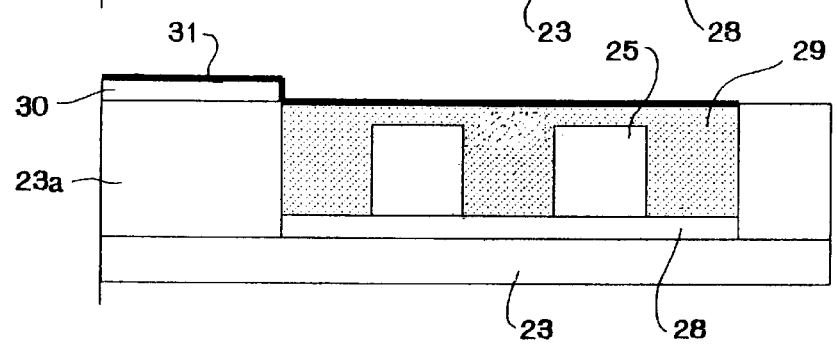
FIG. 4 is an explanation view showing a step in which a gap layer is formed.

Next, as shown in FIG. 4, the gap layer 31, which is made of, for example, $SiO_2$, is formed on the surfaces of the high magnetic permeability layer 30 and the first insulating layer 29.

Figure 5:
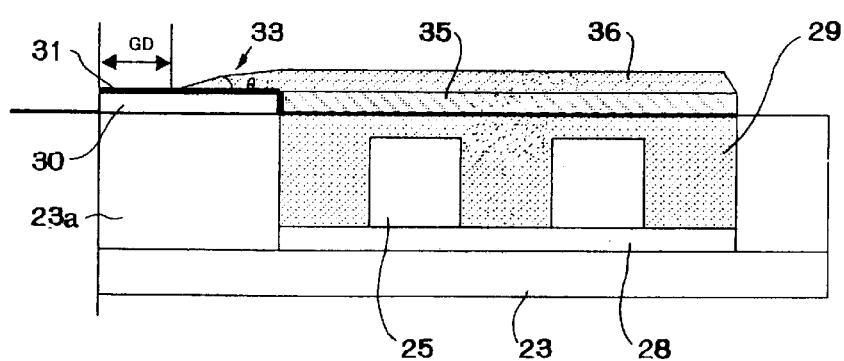
FIG. 5 is an explanation view showing a step in which a second and a third insulating layers are formed.
Figure 6:
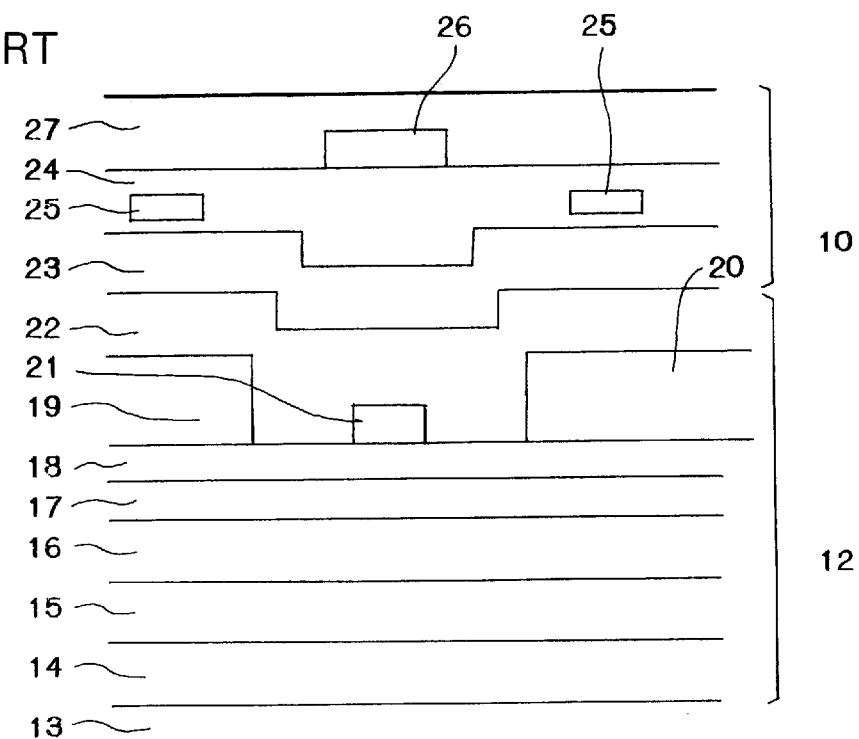
FIG. 6 is a schematic view showing the structure of the conventional thin film magnetic head.
Figure 8:
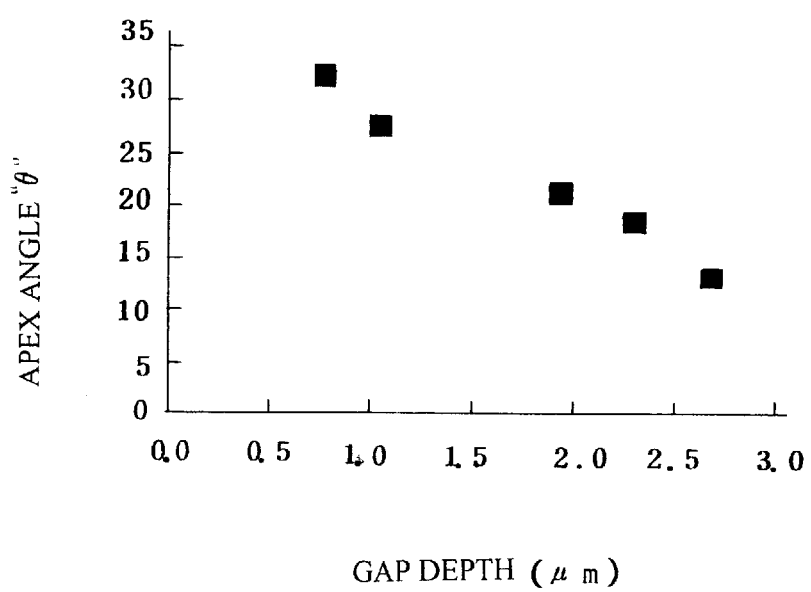
FIG. 8 is a graph showing the relationship between the gap depth GD and the apex angle θ.

The above described steps are equal to those of the conventional method. Next, as shown in FIG. 5, a second insulating layer 35 is formed on the first insulating layer so as to make up the level difference between the high magnetic permeability layer 30 and the first insulating layer 29. The second insulating layer 35 too may be made of thermosetting resin.

Level of surfaces of the second insulating layer 35 and the gap layer 31 are made equal to form a flat surface.

Next, a third insulating layer 36, which covers the second insulating layer 35 and which has the apex part 33 covering a part of the gap layer 31 (the lower magnetic pole 23a), is formed.

The apex angle θ of the apex part can be controlled by adjusting viscosity of the resin forming the third insulating layer 36.

The third insulating layer 36 too may be made of thermosetting resin.

By employing the third insulating layer 36 made of the resin, the gap depth GD is slightly varied by shrinkage. The variation of the gap depth GD can be controlled by previously considering shrinkage percentage.

Since the third insulating layer 36 is formed on the flat surfaces of the gap layer 31 and the second insulating layer 35 with no level difference, the apex angle θ is seldom varied even if the third insulating layer 36 is shrunk. Even if the resin is shrunk, a front end of the apex part is merely slightly moved with maintaining the apex angle θ.

Figure 7:
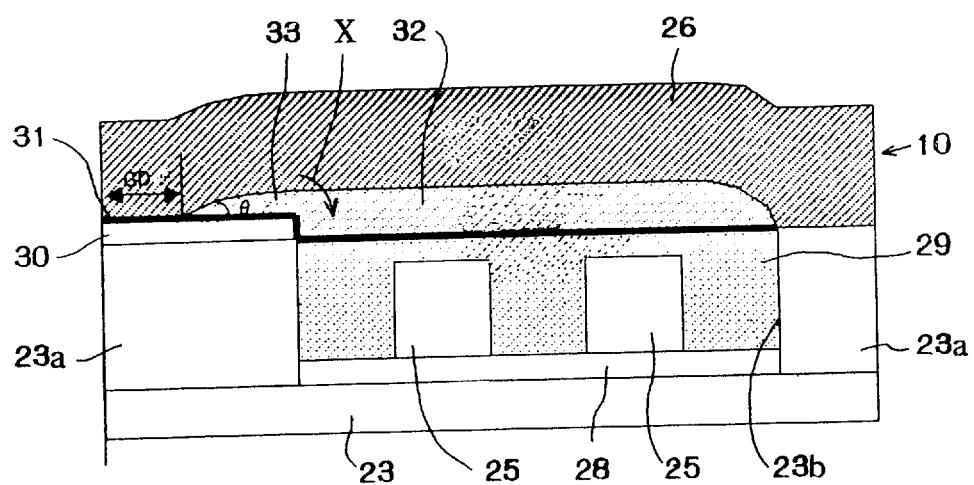
FIG. 7 is a sectional view of the recording head section of the conventional thin film magnetic head.

In the conventional thin film magnetic head, the level difference is disappeared and the apex part 33 is formed by one insulating layer 32 made of one sort of resin (see FIG. 7). The resin is drawn toward a thicker part of the insulating layer 32 (in the direction of an arrow "X" shown in FIG. 7) in the vicinity of a corner of a step-shaped part formed by the level difference when the resin is shrunk. By drawing the resin, the apex angle θ of the apex part 33 is varied. The apex angle θ is also varied by the gap depth GD. Namely, if the gap depth GD is adjusted, the apex angle θ is undesirably and unexpectedly varied.

On the other hand, in the present embodiment, the third insulating layer 36 is formed on the flat surface, so that the apex angle θ is seldom varied even if the third insulating layer 36 is shrunk. As described above, the apex angle θ can be controlled by adjusting the viscosity of the resin.

Therefore, in the present embodiment, the gap depth GD and the apex angle θ can be independently controlled.

Preferably, another high magnetic permeability layer (not shown), which is made of a high magnetic permeability material as well as the high magnetic permeability layer 30, is formed by, for example, spattering so as to cover over the gap layer 31 and the third insulating layer 36.

Next, the upper magnetic pole 26 is formed on the high magnetic permeability layer (not shown) by electrolytic plating. In this case, the high magnetic permeability layer is used as an electric supply base. Finally, the protection layer 27 is formed on the upper magnetic pole 26 so as to cover the magnetic pole 26, so that the thin film magnetic head can be completed.

Note that, the third insulating layer 36 is formed on the flat surface, so the third insulating layer 36 may be an insulating film, e.g., $SiO_2$ film, $Al_2O_3$ film, which is formed by spattering. In this case, the inclination of the apex part 33 may be formed by ion milling. Therefore, the gap depth GD and the apex angle θ can be further independently controlled.

In the above described embodiment, the thin film magnetic head is an integral-type head in which the recording head section 10 and the reproducing head section 12 are vertically piled, but the present invention is not limited to the embodiment. For example, the present invention can be applied to the thin film magnetic head, in which the recording head section and the reproducing head section are arranged side by side or in which the recording head section is solely formed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A thin film magnetic head comprising:
    a lower magnetic pole;
    an upper magnetic pole;
    an insulating layer being formed between said lower magnetic pole and said upper magnetic pole, said insulating layer having a apex part which is formed in the vicinity of a write-end of said thin film magnetic head and whose thickness is made thinner toward the write-end;
    a coil being formed in said insulating layer; and
    a gap layer being formed between the write-end of said lower magnetic pole and the write-end of said upper magnetic pole which are faced each other,
    wherein said insulating layer includes a first insulating layer, a second insulating layer and a third insulating layer,
said coil is provided in a concave part formed in said lower magnetic pole;

said concave part is filled with the first insulating layer, which insulates said coil from said lower magnetic pole, a high magnetic permeability layer, whose magnetic permeability is higher than that of said lower magnetic pole, is formed on a surface of said lower magnetic pole which faces said upper magnetic pole at the write-end, said gap layer is formed on said high magnetic permeability layer, the second insulating layer is formed on said first insulating layer so as to make up a level difference between said high magnetic permeability layer and the first insulating layer, and the third insulating layer is formed on the second insulating layer and has said apex part.

2. The thin film magnetic head according to claim 1, wherein said third insulating layer is a film of $SiO_2$.

3. The thin film magnetic head according to claim 1, wherein said third insulating layer is a film of $Al_2O_3$.

4. A method of manufacturing a thin film magnetic head, which comprises: a lower magnetic pole; an upper magnetic pole; an insulating layer being formed between said lower magnetic pole and said upper magnetic pole, said insulating layer having a apex part which is formed in the vicinity of a write-end of said thin film magnetic head and whose thickness is made thinner toward the write-end, said insulating layer including a first insulating layer, a second insulating layer, a third insulating layer and a fourth insulating layer; a coil being formed in said insulating layer; and a gap layer being formed between the write-end of said lower magnetic pole and the write-end of said upper magnetic pole which are faced each other, comprising the steps of:

forming said lower magnetic pole, which has a concave part for accommodating said coil, in a substrate;

forming the fourth insulating layer in the concave part;

forming said coil on the fourth insulating layer;

forming the first insulating layer which covers over said coil and fills the concave part;

forming a high magnetic permeability layer, whose magnetic permeability is higher than that of said lower magnetic pole, on a surface of said lower magnetic part which faces said upper magnetic pole at the write-end;

forming said gap layer on said high magnetic permeability layer;

forming the second insulating layer on the first insulating layer so as to make up a level difference between said high magnetic permeability layer and the first insulating layer;

forming the third insulating layer which covers the second insulating layer and which has said apex part; and forming an upper magnetic pole which covers over said gap layer and the third insulating layer.

5. The method according to claim 4, wherein the third insulating layer is made of resist.

6. The method according to claim 4, wherein the third insulating layer is a film of $SiO_2$ or $Al_2O_3$ formed by spattering, and said apex part is formed by ion milling.

* * * * *

UNITED STATES PATENT AND TRADEMARK OFFICE
CERTIFICATE OF CORRECTION

PATENT NO. : 6,809,902 B2
DATED : October 26, 2004
INVENTOR(S) : Yukinori Ikegawa It is certified that error appears in the above-identified patent and that said Letters Patent is hereby corrected as shown below:

<u>Title page,</u>
Item [57], ABSTRACT,
Line 5, delete "having a apex" and insert -- having an apex --.
Line 7, delete "faced each other" and insert -- that face each other --.

<u>Column 6,</u>
Line 54, delete "a apex" and insert -- an apex --.
Line 62, delete "which are faced each other" and insert -- which face each other --.

<u>Column 7,</u>
Line 25, delete "having a apex" and insert -- having an apex --.
Line 33, delete "are faced" and insert -- face --.

Signed and Sealed this

Seventh Day of March, 2006

JON W. DUDAS
*Director of the United States Patent and Trademark Office*